(12) United States Patent
Rud et al.

(10) Patent No.: US 10,317,295 B2
(45) Date of Patent: Jun. 11, 2019

(54) HEAT FLUX SENSOR

(71) Applicant: Rosemount Inc., Chanhassen, MN (US)

(72) Inventors: Jason H. Rud, Mayer, MN (US); Allen John Kassen, St. Louis Park, MN (US)

(73) Assignee: Rosemount Inc., Shakopee, MN (US)

( * ) Notice: Subject to any disclaimer, the term of this patent is extended or adjusted under 35 U.S.C. 154(b) by 197 days.

(21) Appl. No.: 15/282,760

(22) Filed: Sep. 30, 2016

(65) Prior Publication Data

US 2018/0094990 A1    Apr. 5, 2018

(51) Int. Cl.
| | |
|---|---|
| *G01K 17/00* | (2006.01) |
| *G01K 7/00* | (2006.01) |
| *G01K 1/00* | (2006.01) |
| *G01K 7/16* | (2006.01) |
| *G01K 7/42* | (2006.01) |

(52) U.S. Cl.
CPC .............. *G01K 17/00* (2013.01); *G01K 7/16* (2013.01); *G01K 7/427* (2013.01)

(58) Field of Classification Search
USPC ........................ 374/29, 183, 185, 166, 208
See application file for complete search history.

(56) References Cited

U.S. PATENT DOCUMENTS

| | | | |
|---|---|---|---|
| 3,607,445 A | 9/1971 | Hines | |
| 3,913,403 A * | 10/1975 | Arcara | G01K 7/24 374/173 |
| 5,568,121 A | 10/1996 | Lamensdorf | |
| 6,252,510 B1 | 6/2001 | Dungan | |
| 6,473,710 B1 | 10/2002 | Eryurek | |
| 6,670,887 B2 | 12/2003 | Dungan | |
| 6,794,991 B2 | 9/2004 | Dungan | |
| 7,089,778 B2 | 8/2006 | Rabenecker et al. | |
| 7,345,590 B2 | 3/2008 | Nakano et al. | |
| 8,358,105 B2 | 1/2013 | Barten et al. | |
| 8,360,635 B2 | 1/2013 | Huang et al. | |
| 2001/0053172 A1* | 12/2001 | Sakowsky | G01K 1/143 374/147 |
| 2005/0109100 A1* | 5/2005 | Eldridge | G01F 1/6965 73/204.18 |
| 2006/0048568 A1 | 3/2006 | Korniyenko et al. | |

(Continued)

FOREIGN PATENT DOCUMENTS

| | | |
|---|---|---|
| CN | 201945401 U | 8/2011 |
| EP | 1079219 A2 | 2/2001 |
| WO | WO02057764 A2 | 7/2002 |

OTHER PUBLICATIONS

"https://web.archive.org/web/20110516033409/http://www.omega.com/Temperature/pdf/RTD_Gen_Specs_Ref.pdf" to Omega, May 16, 2011.*

(Continued)

*Primary Examiner* — Mirellys Jagan
(74) *Attorney, Agent, or Firm* — Christopher R. Christenson; Kelly, Holt & Christenson PLLC (57) ABSTRACT

A heat flow sensor configured to provide an indication of temperature relative to a process fluid is provided. The sensor comprises a first resistance temperature detector (RTD) element and a second RTD element spaced within a sheath from the first RTD element. The sensor also includes a set of leads comprising a first subset and a second subset, wherein the first subset is coupled to the first RTD element and the second subset is coupled to the second RTD element.

20 Claims, 5 Drawing Sheets

(56) References Cited

U.S. PATENT DOCUMENTS

| | | | |
|---|---|---|---|
| 2007/0183478 A1* | 8/2007 | Becker | G01K 7/20 |
| | | | 374/183 |
| 2009/0296781 A1 | 12/2009 | Weber et al. | |
| 2010/0158073 A1* | 6/2010 | Marks | G01K 15/00 |
| | | | 374/183 |
| 2013/0005372 A1 | 1/2013 | Strei | |
| 2014/0056325 A1* | 2/2014 | Guerra | G01K 7/24 |
| | | | 374/1 |
| 2015/0177206 A1 | 6/2015 | Basham et al. | |
| 2015/0185085 A1 | 7/2015 | Converse | |
| 2015/0204830 A1 | 7/2015 | Arunachalam | |

OTHER PUBLICATIONS

International Search Report and Written Opinion for International Patent Application No, PCT/US2017/048385, dated Nov. 23, 2017, 15 pages.

"HFS-A Heat Flux Sensors" RDF Corporation, retrieved from www.rdfcorp.com, dated May 10, 2016, 3 pages.

"Heat Flux Sensors" Data Sheet Index, RDF Corporation, retrieved from www.rdfcorp.com, dated May 10, 2016, 1 page.

"What are RTD Sensors?" Omega Engineering, retrieved from www.omega.com on Feb. 24, 2017, 4 pages.

First Chinese Office Action dated Mar. 25, 2019 for Chinese Patent Application No. 2019032001451700, 20 pages including English translation.

* cited by examiner

HEAT FLUX SENSOR

BACKGROUND

There are many industrial applications where knowledge of temperature and heat flow measurements within a process is important for controlling or monitoring the process. A thermowell is a known instrument which allows measuring process fluid temperature within a vessel, such as a pipe. However, temperature sensors within thermowells may be susceptible to errors when there are differences between ambient and process temperature, particularly for thermowells.

SUMMARY

A heat flow sensor configured to provide an indication of temperature relative to a process fluid is provided. The sensor comprises a first resistance temperature detector (RTD) element and a second RTD element spaced within a sheath from the first RTD. The sensor also includes a set of leads comprising a first subset and a second subset, wherein the first subset is coupled to the first RTD element and the second subset is coupled to the second RTD element.

DETAILED DESCRIPTION OF ILLUSTRATIVE EMBODIMENTS

Some solutions to problems with existing industrial process temperature sensors are known. For example, an industrial pipe skin temperature sensor may be coupled to a transmitter and may detect and report temperature measurements by inferring heat flow. However, using a pipe skin temperature sensor requires a thermal conductivity from the process to the transmitter to be known, which may require the sensor to be directly connected to the transmitter which may be difficult where process temperature measurements are elevated with respect to ambient temperatures. This may limit applications where the process fluid temperature is high. Adding an extension between the sensor and the transmitter could help in such situations. However, due to environmental effects, the measurement error could become more pronounced. Additionally, while insulation controls heat flow through a sensor assembly into a transmitter housing and may help reduce environmental effects that could induce a non-linear temperature profile, it also makes inspection of the pipe and the interface with the pipe more difficult.

For temperature sensors in shallow thermowells, ambient temperature may induce error in the sensing element. The difference between ambient and process temperatures can create a gradient across the sensor element, which may cause measurement errors exceeding 5° Celsius. It may be difficult to determine how much error is introduced, and obtain an accurate temperature reading.

One potential solution to the problems described above is the use of a heat flux sensor, some of which are currently available. However, current heat flux sensors are fragile, expensive to produce, and have a limited temperature measurement range that may not be useful for all industrial processes. A heat flux sensor is desired that solves for the problems described above, and is robust and conducive to economic manufacturing. At least some embodiments presented herein provide such solutions.

A resistance temperature detector (RTD) is a temperature sensor with a resistive element that has a resistance that varies with temperature. RTD sensors may function over a wider temperature range, provide better accuracy, better interchangeability and longer term stability than other sensor configurations.

Figure 1A:
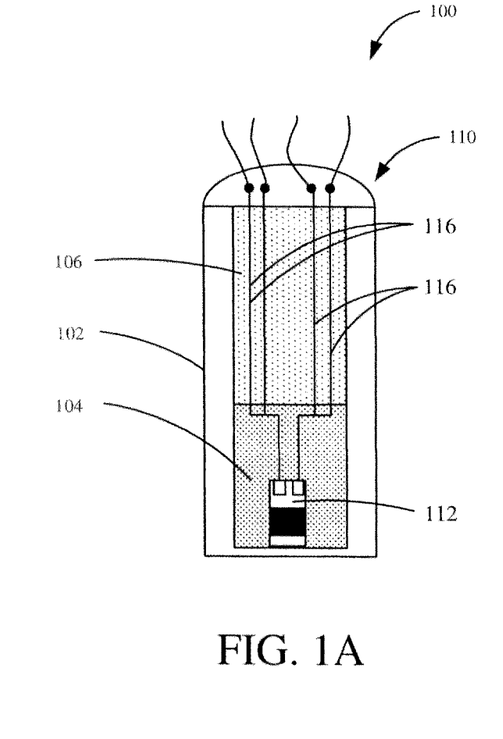
FIGS. 1A-1C illustrate example sensor configurations in accordance with some embodiments of the present invention.
Figure 1B:
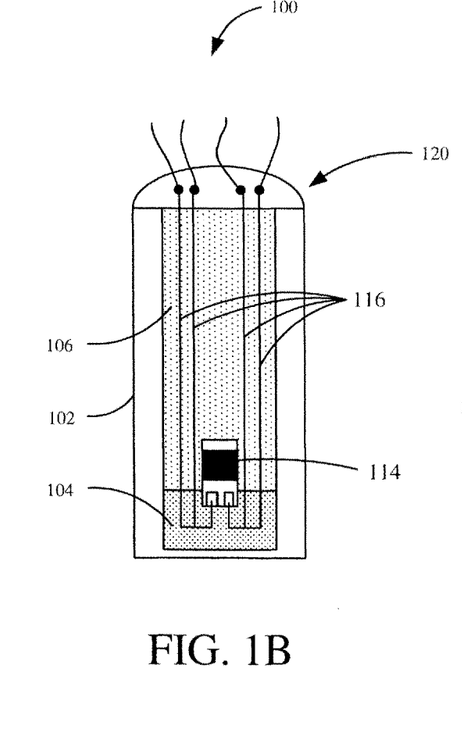
Figure 1C:
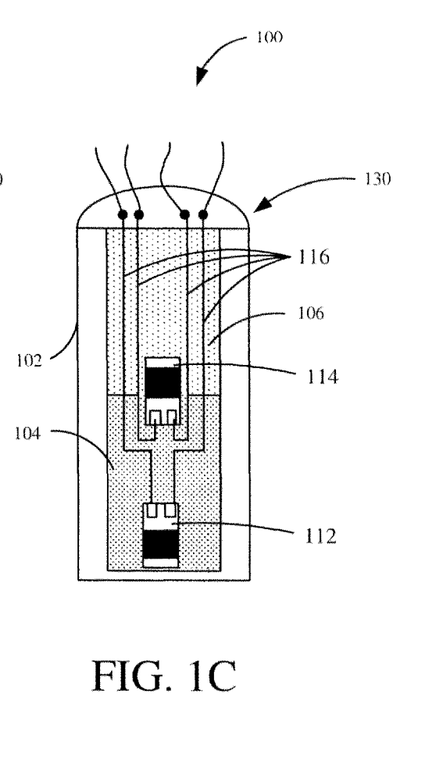

FIGS. 1A-1B illustrate current RTD configurations that may be combined and leveraged to provide a heat flux sensor in accordance with an embodiment of the present invention, as shown in FIG. 1C. A heat flux sensor comprises two RTDs, which can be in a forward-facing configuration, as shown in FIG. 1A, or a reverse-bore configuration, as shown in FIG. 1B. FIG. 1C illustrates one example of a heat flux sensor utilizing both a forward-facing RTD configuration and a reverse-bore configuration.

FIG. 1A illustrates a configuration 110, comprising a forward facing RTD sensor, with a forward-facing RTD element 112 within sensor capsule 102. Capsule 102, in one embodiment, includes mineral insulation powder configured to maintain separation between different leads 116 and RTD element 112. The mineral insulation may be present in two compositions: a less dense mineral insulation 104 and a more dense mineral insulation 106. In one embodiment, mineral insulations 104 and 106 comprise a mineral insulation powder. Forward facing RTD element 112, in one embodiment, is positioned within less dense mineral insulation 104. In one embodiment, one or more leads 116 are coupled to, and extend from, RTD element 112. In one embodiment, a set of four leads 116 extends from RTD element 112. However, in other embodiments, additional, or fewer leads 116 may extend from RTD element 112.

FIG. 1B illustrates a sensor configuration 120 that includes a reverse bore RTD element 114 within sensor capsule 102. RTD element 114 may, in one embodiment, span an interface between less dense mineral insulation 104 and more dense mineral insulation 106, such that it is partially within a layer of less dense mineral insulation 104 and partially within a layer of more dense mineral insulation 106. In one embodiment, a greater portion of RTD element 114 is located within more dense mineral insulation 106. In another embodiment, however, RTD element 114 may substantially equally span mineral insulation layers 104 and 106, or have a greater portion within less dense mineral insulation 104. In one embodiment, sensor configuration 120 comprises one or more leads 116 that couple to, and extend from, RTD element 114, pass through mineral insulation layers 104 and 106, and exit sensor capsule 102. As illustrated in FIGS. 1A and 1B, one notable difference between forward facing sensor configuration 110 and reverse bore sensor configuration 120 is the positioning of RTD elements 112 and 114, with respect to mineral insulation layers 104 and 106. Another different between RTD elements 112 and 114 is the coupling orientation with respect to leads 116.

FIG. 1C illustrates heat flow sensor in accordance with an embodiment of the present invention. The heat flow sensor provides a direct indication that is related to heat flux. Sensor configuration 130 comprises a combination of a forward facing RTD element 112 and a reverse bore RTD element 114. In one embodiment, RTD element 112 faces RTD element 114. While mixed sensor configuration 130 comprises four leads 116, only a subset of leads 116 are connected to each of RTD elements 112 and 114 in one embodiment. In one embodiment, half of the set of leads 116 couple to each of the RTD elements 112 and 114. In one embodiment, leads 116 extending from RTD 112 pass alongside RTD 114 prior to exiting sensor capsule 102. While embodiments of the present invention will generally be described as employing mineral insulation, it is expressly contemplated that other forms of insulation, such as ceramic potting, could be used in accordance with embodiments of the present invention.

In one embodiment, RTD element 112, in a mixed configuration 130, is positioned substantially completely within less dense mineral insulation 104, while RTD element 114 spans the interface between less dense mineral insulation 104 and more dense mineral insulation 106. In one embodiment, a pair of leads 116 extends from RTD element 112, and a second pair of leads 116 extends from RTD element 114.

Figure 2A:
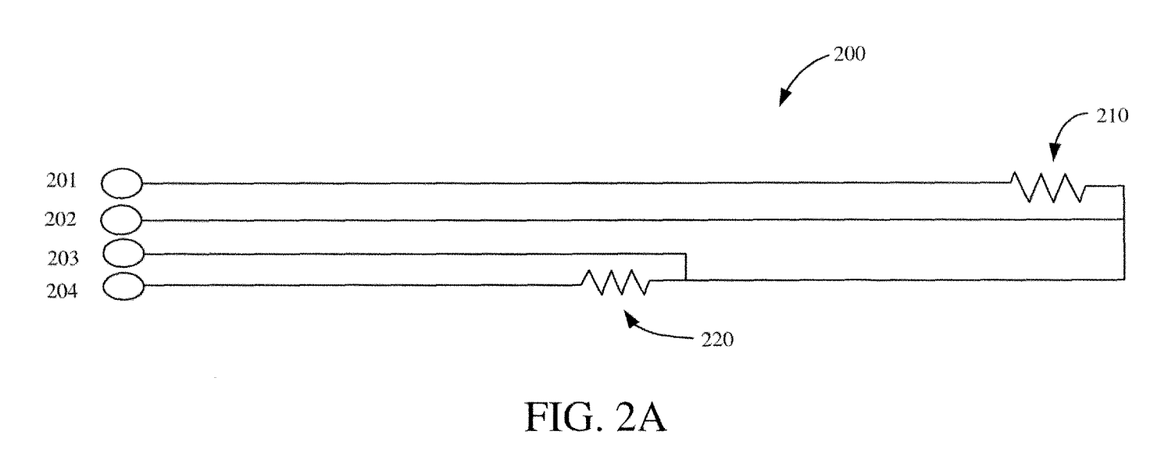
FIGS. 2A and 2B illustrate example lead configurations in accordance with some embodiments of the present invention.
Figure 2B:
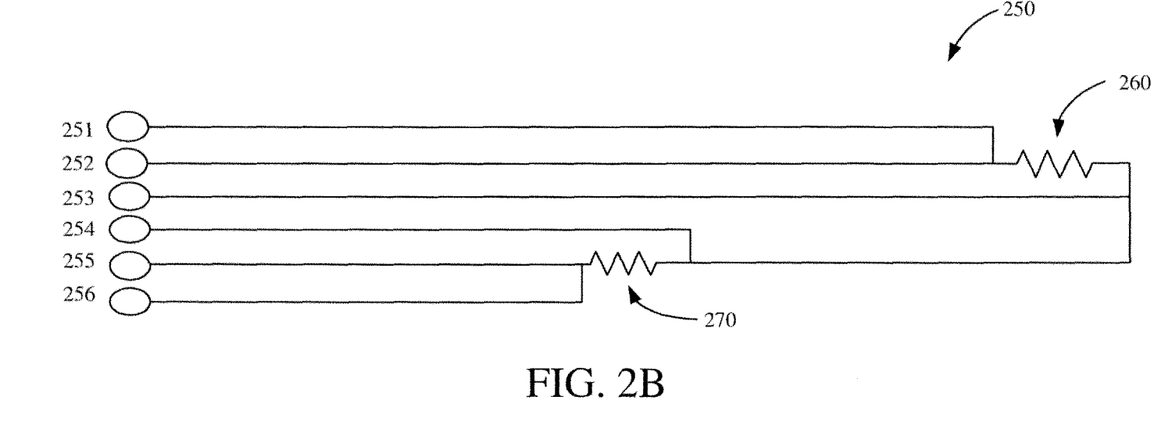

FIGS. 2A and 2B illustrate example lead configurations in accordance with some embodiments of the present invention, FIG. 2A illustrates one example of how RTD elements 112 and 114, or other appropriate sensing elements coupled to a set of leads, may be used in order to obtain temperature measurements of a process. FIG. 2A illustrates a configuration 200 comprising a first RTD element 210 and a second RTD element 220. Sensing element 210 is configured to provide measurements using leads 201, 202 and 203, while sensing element 220 is configured to use leads 202, 203, and 204. The short circuit, in one embodiment, couples leads 202 and 203, and is configured to create a resistance mismatch with the other leads, allowing for a temperature to be calculated. A three wire system, in one embodiment, utilizes two leads for the current carrying path, and a third for evaluating the voltage drop across the current carrying lead. The short present between leads 202 and 203, in one embodiment, is connected to the non-current carrying path. In one embodiment, the two current carrying leads are equal in length, for example, to negate the lead wire resistance.

Use of a mixed sensor configuration, such as that presented in FIG. 1C, for example, may allow a heat flux sensor to be used when remote mounting of a transmitter is necessary. It may also produce an improved thermally conductive path to evaluate heat flow with single channel devices for both static and dynamic process situations. It may also provide a more robust temperature sensor configuration. Therefore, one sensor configuration may provide two three-wire systems for measuring temperature utilizing only four wires within a single sensor capsule. Such a sensor configuration may provide an improved thermally conductive path, with more accurate temperature measurements over broader process temperature ranges.

FIG. 2B illustrates an alternative lead configuration 250 in accordance with another embodiment of the present invention. In one embodiment, lead configuration 250 comprises six leads within mineral insulation such that a first sensing element 260 and a second sensing 270 can operate as dual four-wire RTD measurement systems. In one embodiment, the dual four-wire RTD measurement system is configured by creating a short between two leads, for example leads 253 and 254 as shown in FIG. 2B. Configuration 250 may, in one embodiment, require a dual channel temperature transmitter since there are more than four connection wires present.

Figure 3:
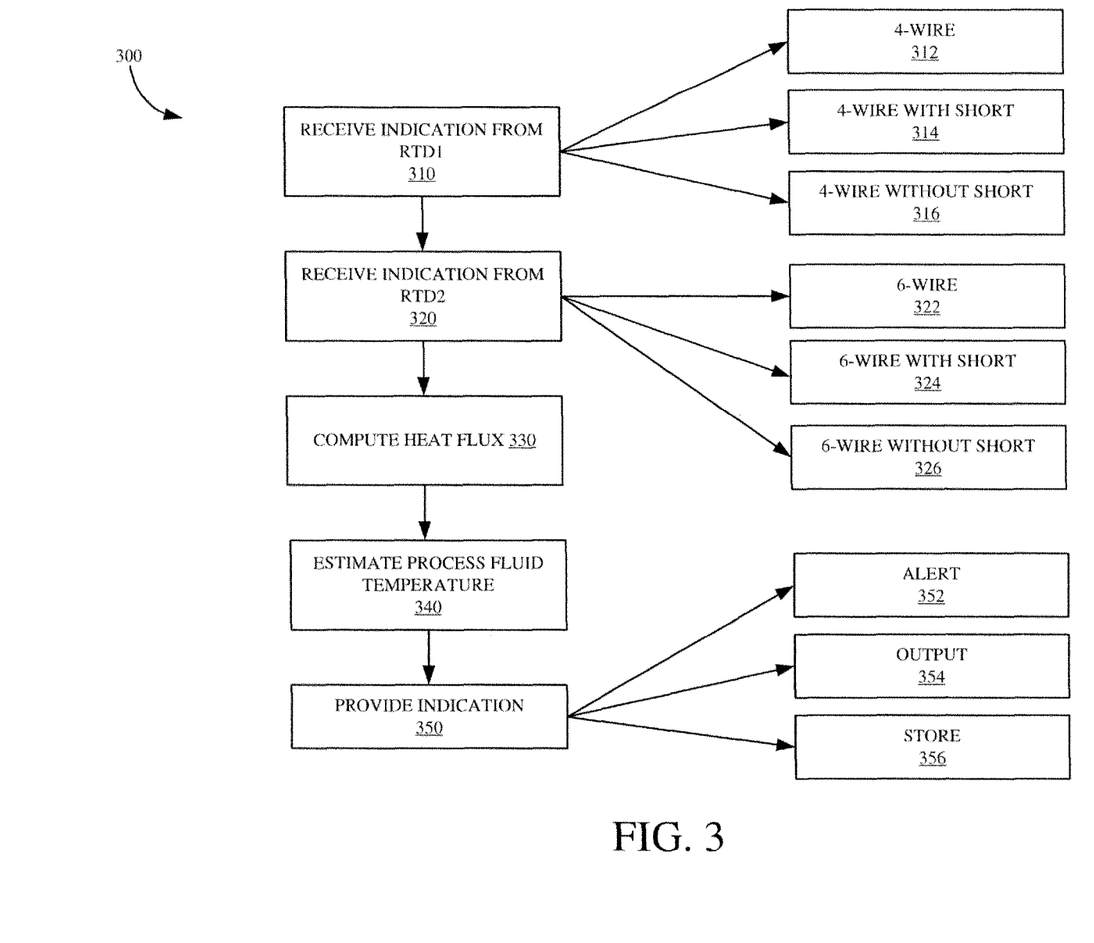
FIG. 3 is a flow diagram of a method of providing an indication of temperature of a process fluid in accordance with one embodiment of the present invention.

FIG. 3 illustrates one example method of measuring heat flux relative to a process in accordance with one embodiment of the present invention. Method 300 may be useful with a sensor configuration such as that shown in FIG. 1C and/or a lead configuration, such as those shown in FIGS. 2A-2B, described above. Additionally, method 300 may also be useful with other appropriate sensor configurations and other lead configurations. In one embodiment, the method includes positioning the sensor in contact with the outer surface of the process vessel wall where the process fluid is contained within the process vessel.

In block 310, an indication is received from a first RTD sensing element In one embodiment, the indication is received from a three-wire subcombination of a four-wire system, such as that shown in FIG. 2A, and as indicated in block 312. In another embodiment, the indication is received from a three-wire subcombination of a 6-wire system, such as that shown in FIG. 2B, and as indicated in block 316. In a further embodiment, the indication is received from a four-wire subcombination of a six-wire system, as indicated in block 314.

In block 320, an indication is received from a second RTD sensing element. In one embodiment, the indication is received from a three-wire subcombination of a four-wire system, such as that shown in FIG. 2A and as indicated in block 322. In another embodiment, the indication is received from a three-wire subcombination of a 6-wire system, such as that shown in FIG. 2B, and as indicated in block 324. In a further embodiment, the indication is received from a four-wire subcombination of a six-wire system, as indicated in block 326.

In one embodiment, the first indication is generated by a forward facing RTD element of a mixed sensor configuration, while the second indication is generated by a reverse bore RTD element. However, in another example, the indications are received first from a reverse bore RTD element and second from a forward facing RTD element.

In block 330, a heat flux calculation is performed on the first and second indications. In block 340, a process fluid temperature is estimated based on the calculated heat flux.

In block 350, an indication of the process fluid temperature is provided. The indication may, in one embodiment, comprise a status of a process, such as 'overheating' or 'within an acceptable range,' for example. In another embodiment, a numerical temperature is provided, for example in degrees Fahrenheit, Celsius or Kelvin. In another embodiment, the indication may be provided in the form of an audible alert as indicated in block 352, for example a flashing light for a temperature above or below a desired range, or as a visual output, as indicated in block 354. For example, an indication of the temperature may be provided on a screen proximate to, or remote from, the sensor transmitter. The indication may also be directly provided to a separate computation device, which may be proximate to, or remote from, the temperature sensor. In another embodiment, providing an indication comprises displaying the temperature proximate the point of measurement along the process stream, for example a screen or audiovisual alert mechanism coupled to the sensor.

In one embodiment, providing an indication also comprises storing the measured temperature, as indicated in block 356. Storing some or all of the detected process temperatures may allow for generating additional analysis, such as trends within a process stream over time. Storing the provided indication may comprise storing locally, for example within a memory of a microvolt meter, or storing remotely, for example sending the detected temperature, or the detected resistance mismatch, to a remote storage medium.

Figure 4:
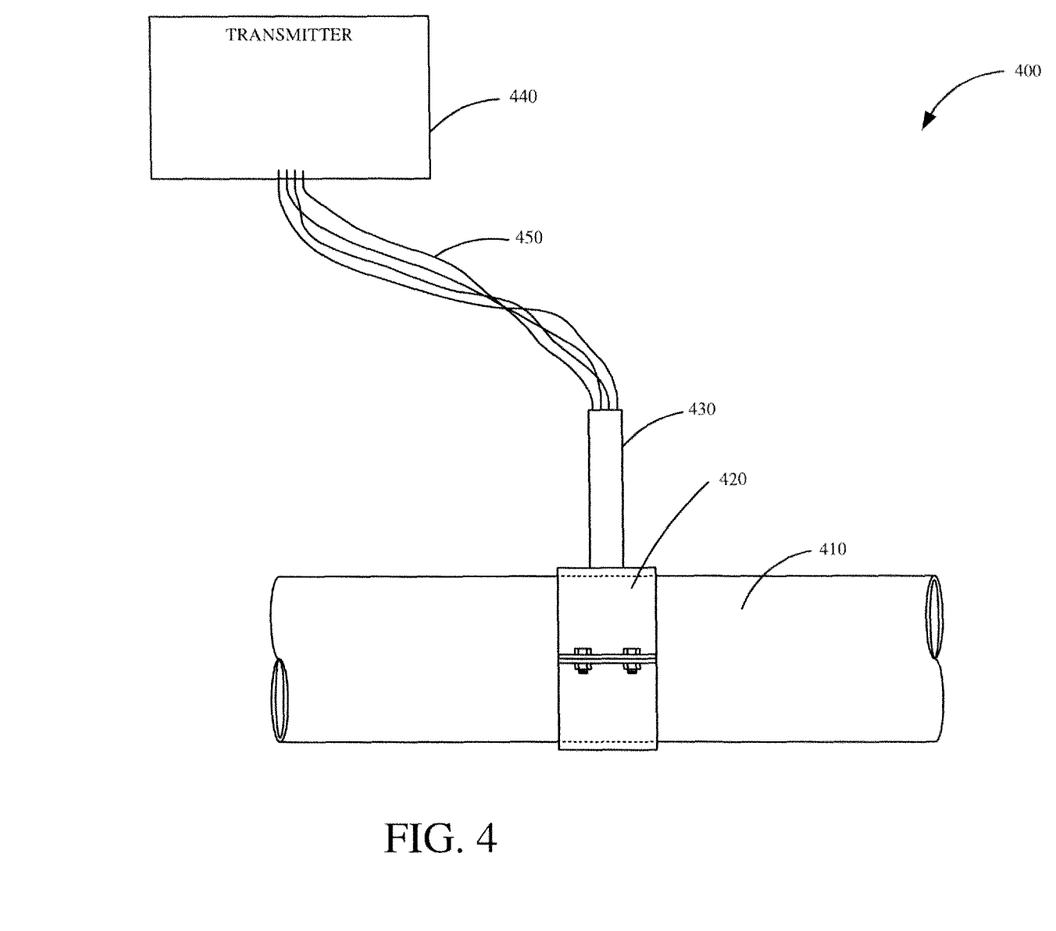
FIG. 4 is a diagrammatic view of a temperature measurement assembly in accordance with one embodiment of the present invention.

FIG. 4 is a schematic drawing of a temperature measurement assembly in accordance with one embodiment of the present invention. Assembly 400, in one embodiment, comprises a sensor assembly 430 coupled to a process vessel wall 410. In one embodiment, the coupling is a pipe clamp 420. Sensor 430 may have one or more leads 450 extending to a transmitter 440, which may be locally connected to, or remote from, the sensor assembly. The transmitter 440 may be configured to perform a heat flux calculation, for example the calculation of method 300, described above.

Figure 5:
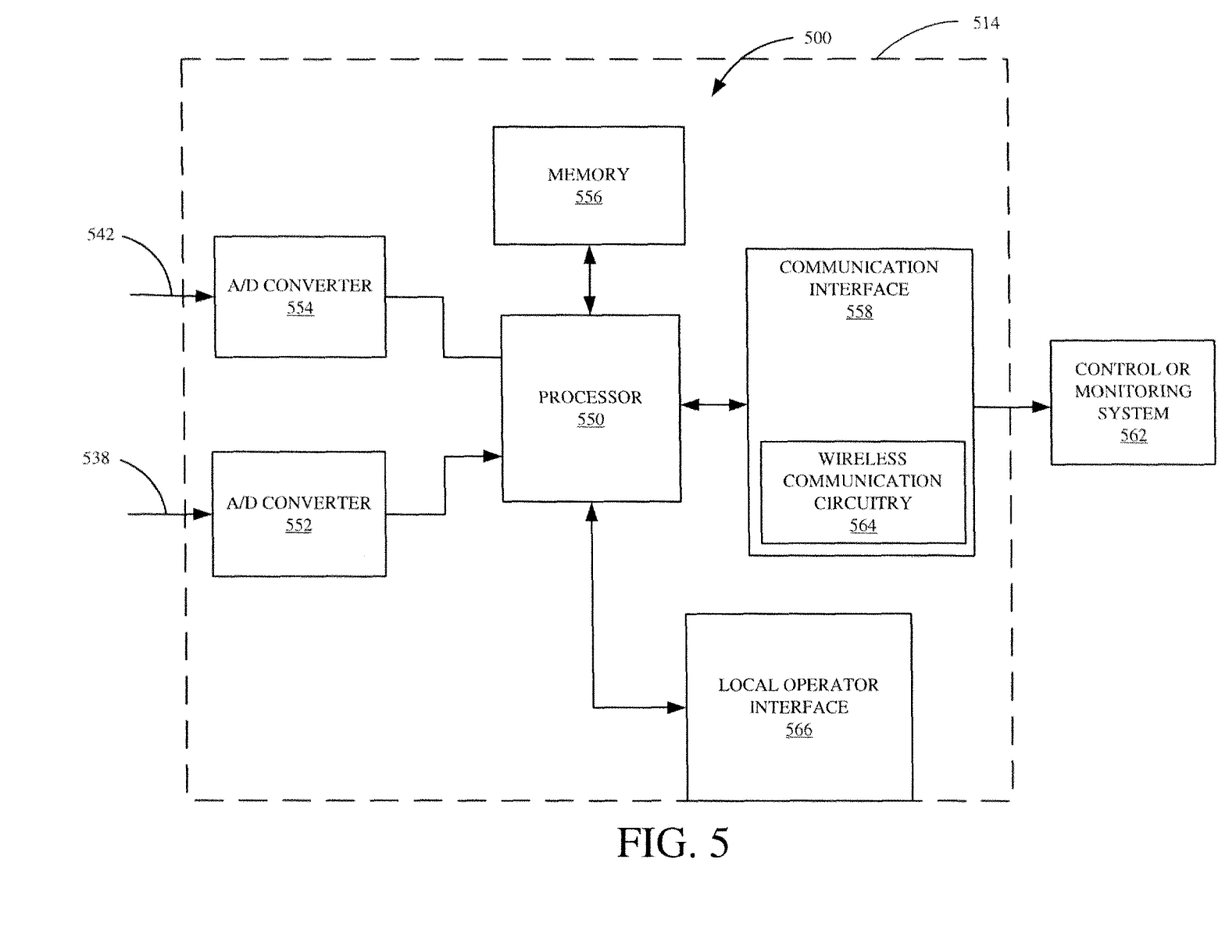
FIG. 5 is a block diagram of device electronics in accordance with one embodiment of the present invention.

FIG. 5 is a schematic drawing of electronics in accordance with one embodiment of the present invention. Electronics 500 may, in one embodiment, be housed within electronics housing 514. Electronic housing 514 may, in one embodiment, comprise transmitter 440 of FIG. 4. In another embodiment, at least some of electronics 500 form part of a sensor assembly, such as those of FIGS. 2 and 3. Electronics 500, in one embodiment, comprises a processor 550, a first A/D converter 552, a second A/D converter 554, and a memory 556. Processor 550, in one embodiment, is a digital microprocessor. Memory 556, in one embodiment, comprises a digital data storage device electrically coupled to processor 550. In one embodiment, electronics 500 may be locally accessibly through a local operator interface 566 that may, for example, display a temperature or a device status.

Processor 550 is connected to a temperature sensor, for example sensor assembly 430, by a coupling between first A/D converter 552 and one or more sensor leads 538. First A/D converter 552, in one embodiment, is configured to receive and convert the analog electrical signal from a first sensor assembly to a digital signal for processor 550. Second A/D converter 554 connects processor 550 to a second sensor assembly. In one embodiment, first and second sensor assemblies comprise RTD sensors, such as the RTD elements presented in FIGS. 1A-1C. Second A/D converter 554 is electrically connected to sensor wires 542 to convert the analog electrical signal from sensing device 430 to a digital signal for processor 550.

In one embodiment, electrical housing 514 may also include communication interface 558. Communication interface 558 provides communication between electronics 500 and control or monitoring system 562. Electronics 500 may transmit a calculated temperature of a process fluid within a process, such as process 410 shown in FIG. 4, to a control system 562. Communication between temperature measurement assembly 510 and control system 562 can be through any suitable wireless or hard-wired connection. For example, communication may be represented by an analog current over a two-wire loop that ranges from 4 to 20 mA. Alternatively, the communication may be transmitted in a digital form over a two-wire loop using the HART digital protocol, or over a communication bus using a digital protocol such as Foundation fieldbus. Communication interface 558 may optionally include wireless communication circuitry 564 for communication by wireless transmission using a wireless protocol such as WirelessHART (IEC 62591). Moreover, communication with control or monitoring system 562 can be direct or through a network of any number of intermediate devices, for example, a wireless mesh network (not shown). Communication interface 558 can help manage and control communication to and from temperature measurement assembly 500. For example, control or monitoring system 562 may provide for configuration of temperature measurement assembly 500, including entering or selecting base structure parameters, process vessel wall parameters, or selecting a heat transfer model for a particular application, by way of communication interface 558.

Although the present invention has been described with reference to preferred embodiments, workers skilled in the art will recognize that changes may be made in form and detail without departing from the spirit and scope of the invention.

What is claimed is:

1. A heat flow sensor configured to provide an indication of temperature relative to a process fluid, the heat flow sensor comprising:
   a first resistance temperature detector (RTD) element;
   a second RTD element spaced within a sheath from the first RTD element; and
   a set of leads comprising a first subset and a second subset, wherein the first subset is coupled to the first RTD element and the second subset is coupled to the second RTD element; and
   wherein the first RTD element and second RTD element face opposite directions.

2. The heat flow sensor of claim 1, wherein a processor is configured to estimate the temperature of the process fluid based on signals from the first and second RTD elements.

3. The heat flow sensor of claim 1, wherein the first RTD element comprises a forward facing RTD element.

4. The heat flow sensor of claim 1, wherein the first RTD element comprises a reverse bore RTD element.

5. The heat flow sensor of claim 1, wherein the first subset of leads comprises a first lead and a second lead, the second subset of leads comprises a third lead and a fourth lead.

6. The heat flow sensor of claim 1, wherein the set of leads comprises six leads.

7. The heat flow sensor of claim 1, wherein the first and second RTD elements are positioned within a sensor capsule.

8. The heat flow sensor of claim 1, wherein the first subset and the second subset are physically coupled.

9. The heat flow sensor of claim 1, wherein the sensor is positioned to contact an outer surface of a conduit of the process fluid.

10. The heat flow sensor of claim 9, wherein the first RTD element is a forward facing RTD element that is positioned toward the outer surface of the conduit.

11. The heat flow sensor of claim 1, wherein the second RTD element is spaced from the first RTD element by mineral insulation.

12. The heat flow sensor of claim 11, wherein the mineral insulation comprises a first mineral insulation layer and a second mineral insulation layer.

13. The heat flow sensor of claim 12, wherein one of the first and second RTD elements is positioned substantially within the first mineral insulation layer.

14. The heat flow sensor of claim 12, wherein one of the first and second RTD elements is positioned such that it spans an interface between the first mineral insulation layer and the second mineral insulation layer.

15. A heat flow sensor comprising:
   a first resistance-based temperature sensing element coupled to a first lead and a second lead;

a second resistance-based temperature sensing element coupled to a third lead and a fourth lead;

a physical coupling between the second lead and the third lead; and wherein the first resistance-based temperature sensing element is configured to operate as a first three-lead resistance detection system, the second resistance-based temperature sensing element is configured to operate as a second three-lead resistance detection system, and wherein the first and second three-lead resistance detection system are configured to independently detect a resistance.

16. The heat flow sensor of claim 15, wherein the first and second resistance-based temperature sensing elements comprise resistance temperature detector (RTD) elements.

17. The heat flow sensor of claim 15, wherein the first and second resistance-based temperature sensing elements are substantially surrounded by a mineral insulation.

18. The heat flow sensor of claim 15, wherein the physical coupling comprises a short.

19. The heat flow sensor of claim 15, wherein the first resistance-based temperature sensing element comprises a forward facing RTD element.

20. The heat flow sensor of claim 19, wherein the resistance-based temperature second sensing element comprises a reverse bore sensing element.

* * * * *